United States Patent Office 2,983,505
Patented May 9, 1961

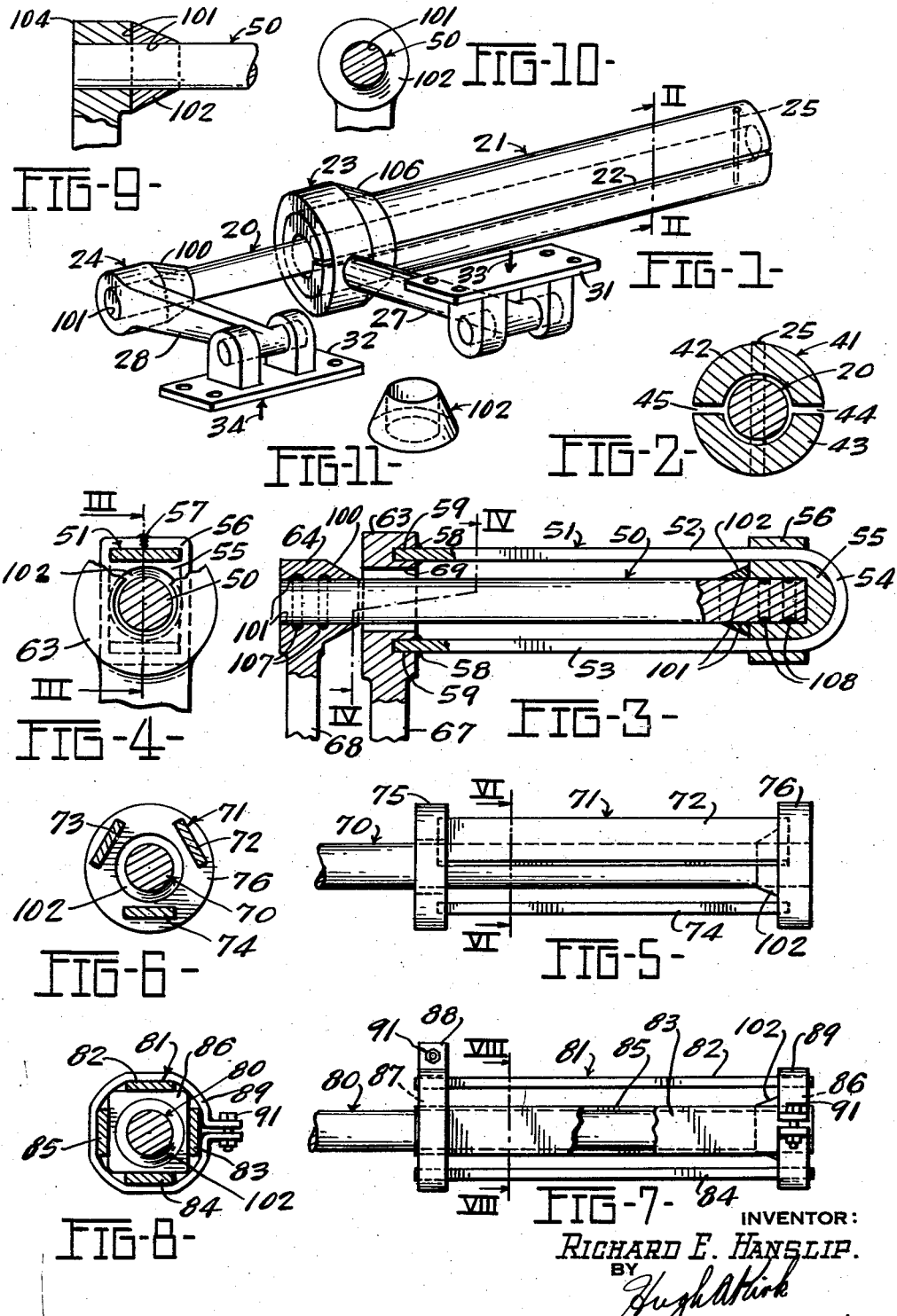

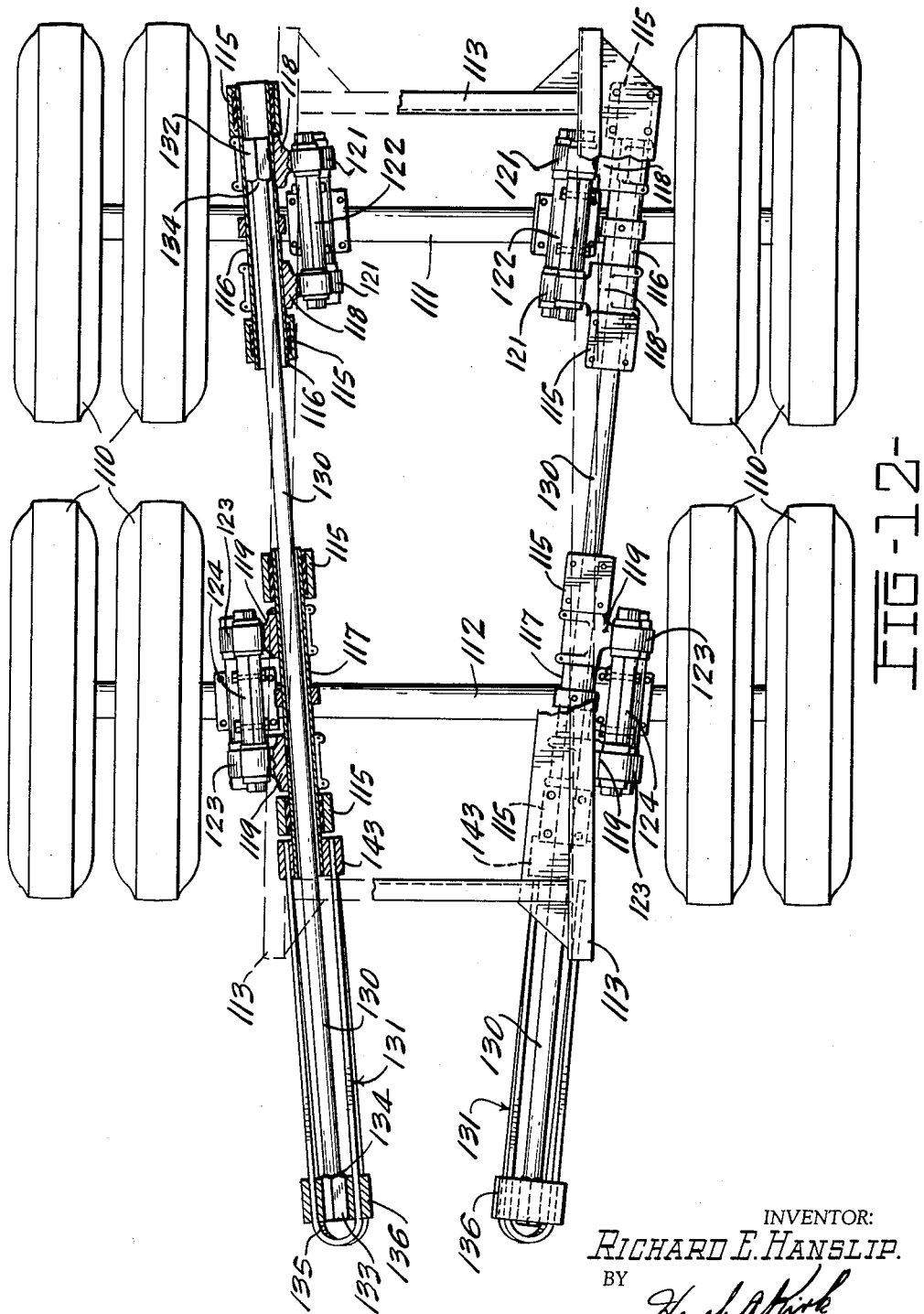

2,983,505

TORSION SPRING

Richard E. Hanslip, Toledo, Ohio, assignor to The Mather Spring Company, Toledo, Ohio, a corporation of Ohio Filed Apr. 29, 1957, Ser. No. 655,771

7 Claims. (Cl. 267—57)

This invention relates to a torsion spring assembly and the method of making the same. More particularly, it deals with a torsion spring having two different torsion members connected together at adjacent ends thereof, and torque anchors connected to each torsion member at its other end, including the method of making such connections. A specific example of the use of such a torsion spring assembly is in the resilient suspension of vehicle wheels or axles on vehicles, including also the resilient suspension between the tandem axles of a tandem axle vehicle.

It is an object of this invention to produce a simple, relatively short, compact, efficient, effective and economic torsion spring which has improved resilient properties over those of multi-leaf leaf-springs which have been commonly used on vehicles in the past.

Another object is to produce a torsion spring which may be manufactured in many different shapes and forms, and may be readily adapted to different degrees of flexibility, including successive stages of flexibility in the same assembly.

Another object is to produce such a torsion spring which is readily adaptable for the automatic compensation of loads by changing the effective length of a lever arm of a pivoted lever.

Another object is to produce such a torsion spring which may be employed in the suspension of a vehicle so that no shock absorbers are required and still the vehicle does not roll on turning or dip on braking, as well as producing a softer ride for the occupants of the vehicle.

Another object is to produce such a torsion spring in a simple, easy and economic manner by bonding or brazing together the connections between the different members or elements of the spring assembly.

Generally speaking, the torsion spring assembly of this invention comprises two spaced elongated torsion members with different shaped cross sectional areas, connected together at their adjacent ends and having torque anchor and/or lever arm connections fastened at or near their opposite, effective, or other ends, with one of the torsion members having a discontinuous cross-section throughout its effective length, which discontinuity extends substantially parallel to the axis of that torsion member. The torsion member having the discontinuous cross sectional area may comprise anything from a tube slit down one side thereof, to a plurality of strips spaced and arranged around the axis of the torsion member. Two torsion members may be telescoped one inside the other, wherein the outer of the two torsion members is shorter in length than the central or inner torsion member, and the outer torsion member has the discontinuous cross-section or slits along its length and may surround the inner member substantially throughout the entire effective length of the outer torsion member. The torque anchor connections may comprise collar means which may have integral therewith levers or special shapes so that they may be anchored or positively engaged to transmit the forces to be applied to the torsion spring assembly. By placing one torsion member inside the other, these collar means may be physically adjacent each other at and near the same end of the assembly.

The inner, central, or longer torsion member of the torsion spring assembly of this invention may be a round torsion member or bar of uniform cross-section throughout its entire length without having any upset ends, splines or similar torsion anchor engaging portions, in that these anchors may comprise special collar means which can be bonded or brazed on the round or cylindrical torsion member. This collar means has a cylindrical aperture therein, preferably only slightly larger than the outside diameter of the cylindrical torsion member to which it is to be connected, which collar has attached or fixed therewith a tapered truncated conical ring or beveled rim around the aperture on one side thereof to elongate the cylindrical aperture, with the thickness of the rim decreasing to zero the farther it extends from the collar. This beveled or tapered rim provides a shear-force distributing area between the edge of the collar and the torsion member or bar. This rim may be either made integral with the collar and/or lever arm attached thereto, or it may be machined or formed separately as a ring and then bonded or brazed to the face of the collar when the collar and the ring are bonded or brazed to the cylindrical torsion member. The bonded material thus forms a film between the parts to be bonded together. The bonding or brazing material for this connection, if desired, may be formed into rings and embedded in special circumferential grooves provided therefor in the torsion member or in the aperture in the collar means and then may be melted out to form the bonding film between the adjacent cylindrical surfaces of the collar and torsion member by heat treatment of the assembly. Other means besides bonding or brazing, however, may be employed for connecting the two torsion members and their torque anchors together.

The above mentioned and other features and objects of this invention and the manner of attaining them will become more apparent and the invention itself will be best understood by reference to the following description of embodiments of the invention taken in conjunction with the accompanying drawings, wherein:

Fig. 1 is a perspective view of a torsion spring assembly according to one embodiment of this invention, showing an outer slotted tubular torsion member surrounding an inner cylindrical torsion bar member with bonded connections between the effective ends of the torsion members and their torque lever anchors;

Fig. 2 is a longitudinal cross section of view of another embodiment of a torsion spring assembly similar to one taken along line II—II shown in Fig. 1, having a diametrically split tubular outer torsion member;

Fig. 3 is a longitudinal sectional view of another embodiment of the torsion spring assembly according to this invention having a U-shaped strap outer torsion member including a bonded connection fastening this member to the other torsion member as well as to its torque lever anchor;

Fig. 4 is a sectional view taken in the direction of the arrows along line IV—IV of Fig. 3, showing part of its torque anchor collar broken away, to show how the base of the U-shaped member is clamped to a block bonded to the end of the inner torsion member;

Fig. 5 is a side elevation of another embodiment of a torsion spring assembly according to this invention having a central or inner torsion rod member and three symmetrically arranged parallel straps comprising the outer torsion member;

Fig. 6 is a cross-sectional view taken in the direction of the arrows along line VI—VI of Fig. 5;

Fig. 7 is a further embodiment of a torsion spring assembly according to this invention, similar to that shown in Fig. 5, but comprising four instead of three symmetrically arranged strips making up the outer torsion member;

Fig. 8 is a sectional view taken along line VIII—VIII of Fig. 7, showing a strap type clamping means for fastening the outer torsion member to a collar means for connection to the inner or central torsion member;

Fig. 9 is a section of another embodiment of the means for fastening the collar means or torque lever anchor to the end of the cylindrical bar or torsion member shown in Fig. 3, wherein the tapered or beveled stress distributing rim on the collar means is made separate from the collar and then bonded thereto;

Fig. 10 is right end view of the rim and collar means shown in Fig. 9;

Fig. 11 is a perspective view of a beveled ring shear distributing rim as employed on the collar means shown in embodiments of Figs. 3, 5 and 7; and Fig. 12 is a schematic plan view of the torison spring suspension and sub-structure of a tandem axled vehicle having a pair of torsion spring assemblies, similar to the one shown in the embodiment of Fig. 3, with one of the torsion spring assemblies being shown in longitudinal section, and part of the frame, onto the bottom of which the torsion spring assemblies are mounted, being broken away.

I. *Torsion spring assembly*

Referring first to the embodiment of this invention disclosed in Fig. 1, the essential elements thereof comprise a torsion spring composed of two different types of torsion members, one an inner member or solid bar 20 and the other an outer and surrounding member 21, which outer member comprises a tube having a single longitudinal slit 22 the full length thereof effecting a discontinuous cross-sectional area for the member 21, as seen at the left end thereof mounted in a collar means 23. The length of the outer torsion member 21 is less than that of the inner torsion member 20, so that its collar means 24 may be connected to an end of the member 20 without interfering with the collar means 23. It is through these collar means or torque anchors that the torsional forces are applied to the spring made up of the torsion members 20 and 21. The other and adjacent right ends of the members 20 and 21 are the only portions thereof which are fastened together, which fastening may be accomplished in any one of several different manners, such as by a strong pin 25 extending diametrically through both of said members 20 and 21. The collar means 23 and 24, which are rigidly attached to the free ends of the torsion members 21 and 20, respectively, may have fixed thereto lever arm means 27 and 28, to the outer ends of which levers may be connected pivoted supports 31 and 32, against which supports opposing forces (indicated by the arrows 33 and 34) are applied to be restricted by the resilience of the torsion members 20 and 21 of the spring assembly.

Thus, a force applied by the arrow 33 will be transferred through collar means 23 to twist the slit tube torsion member 21, and from the opposite end thereof through pin 25 to twist the inner torsion bar member 20, back to its collar means 24, and thence through lever arm 28 to counteract the force indicated by the arrow 34. Since there is a space between the outside of the inner member 20 and the inside of the outer torsional member 21 throughout substantially their entire length, except for their connection at their adjacent ends through pin 25, an effective torsional spring equal to the combined length of the members 20 and 21 has been obtained, in a distance only taken up by the length of the member 20. Thus, in a preferred construction of the torsion spring member, the slit tube 21 twists at least as much per unit length as the bar 20 so that the flexibility of this combination is distributed between both members. This compact structure enables the spring assembly of this invention to compete with multiple leaf leaf-springs that are now applied to vehicles.

It is to be understood that in place of the arms 27 and/or 28, the collar means 23 and/or 24 may have polygonal or other shapes and/or be anchored directly to the elements to which the forces indicated by the arrows 33 and 34 are applied.

II. *Modified torsion spring members*

Referring now to Figs. 2 through 8, there are disclosed other outer torsion spring members having discontinuous cross-sectional areas which may be employed in the assembly shown in Fig. 1 instead of the tube 21 with a single split 22 along one side thereof.

Referring first to the embodiment shown in Fig. 2, the outer torsion member 41 may comprise a pair of semi-circular trough members or bent strips 42 and 43 providing diametrically opposite spaces or slots 44 and 45 between them forming a double discontinuity in the cross sectional area of the outer torsion member 41. The trough or channel shaped strips 42 and 43 may be produced by longitudinally and diametrically splitting a tube, or by semi-circularly bending two flat strips. Such a tubular member 41 may be split into three or more arcuate channel sections, if desired, without departing from the scope of this invention.

Another embodiment of torsion spring assembly similar to that shown in Fig. 1, is shown in Figs. 3 and 4, having an inner or central torsion bar or member 50, corresponding to bar 20 in Fig. 1, and an outer torsion member 51 comprising a long U-shaped metal strip having its sides 52 and 53 extending along opposite sides of the member 50. The torsion members 50 and 51 are joined together at the bend or base 54 of the U of the strip. This joint may comprise a block 55 anchored to the adjacent end of the torsion bar 50, and a strap 56 around the outside of the strips 52 and 53 near their base 54 to hold the member 51 against the block 55, which strap 56 may comprise a link welded together at the weld 57 shown in Fig. 4. The free end of the strips 52 and 53 of the outer torsion member 51 may be anchored, such as by welds 58, into slots 59 provided therefor as shown in Fig. 3 in a torque anchor collar means 63, which corresponds to the collar means 23 shown in Fig. 1. The torque anchor for the bar 50, or opposite end of the spring assembly, may comprise a collar means 64, similar to the collar member 24 shown in Fig. 1, both of which collar means 63 and 64 may be provided with lever arms 67 and 68, corresponding respectively to lever arms 27 and 28 shown in Fig. 1. The collar 63, however, is provided with a central aperture 69, sufficiently large to permit free rotation of the bar 50 therein, so that the effective length of the torsion spring assembly will be the sum of the lengths of both the members 50 and 51, and there will be no connection between them except through the block 55.

Still other embodiments of outer torsion members for the torsion spring assembly of this invention, are shown in Figs. 5 and 7, in which the outer torsion members 71 and 81, respectively, around the inner torsion members or bars 70 and 80, comprise three and four symmetrically arranged flat bar strips 72, 73 and 74; and 82, 83, 84 and 85, respectively. In Figs. 5 and 6, the three symmetrically arranged and spaced strips 72, 73, and 74 are shown anchored in similar collars 75 and 76, the former of which corresponds with the collar 63 shown in Fig. 3, and the latter of which may be similar to the collar 75, but with a smaller aperture therein to fit snugly over the end of the bar 70 so as to be easily keyed or fastened thereto to form a fixed connection therewith.

In Figs. 7 and 8 the ends of the four spaced torsion strips 81, 82, 83 and 84 are shown clamped to four sided or square collars 86 and 87, with the aperture in the collar 87 being sufficiently larger to permit free twisting movement of the bar 80 therethrough, while the aperture in the collar 86 is substantially the same size as the outside diameter of the bar 80 to be readily attached thereto, such as by the means described above for the collar 76 in Figs. 5 and 6. The ends of the strips 82, 83, 84 and 85 may be held against the square faces of the collars 86 and 87 by means of surrounding links or straps 88 and 89, which instead of being welded together as shown for the strap 56 in Fig. 4, may be clamped together by bolts 91.

Although not shown in the embodiments of Figs. 5 and 7, the broken off ends of the center or inner torsion bars or members 70 and 80, may be connected to collar means such as 24 or 64, and similarly the collar means 75 and 87, respectively, may be connected to lever arms, such as 27 and 67, or these collar means may be firmly clamped against rotation in a support therefor to counteract any of the torsional forces applied to the other end of the spring assembly beyond the broken off ends of the bars 70 and 80.

III. A method of assembly by bonding

There is specifically shown in Figs. 3, 9, and 11, means for making fixed connections by bonding or brazing the torsion transmitting collar means to the torsion members of the spring assembly, as well as in Figs. 3, 5 and 7 for connecting the block 55, and collars 76 and 86 to the inner torsion rod members 50, 70 and 80, respectively, for fastening the two different torsion members of the assembly together.

Previously, in order to anchor a collar on the end of a torsion member without causing too much strain between the edge of the collar and the torsion bar and to prevent the bar from being twisted in two at the collar, the ends of the bar had been upset to distribute the shearing stresses through a thicker and stronger section of the bar (see upset portions 134 on bar 130 in Fig. 12). Such upsetting is a costly operation.

Attention is now called to the embodiments shown in Figs. 1 through 11 of this invention, in which the central torsion bar or member 20, 50, 70 or 80 has no upset section or end formed integrally thereon, but that the diameter of each bar is uniformly cylindrical throughout its entire length. Therefore, in order to prevent these bars from being twisted in two at their collar means, a tapered rim or ring portion 100, as shown in Figs. 1 and 3 for the collar means 24 and 64 respectively, is provided on one side of and formed integrally with these collar means, which rim 100 acts to distribute the shearing forces at the edge of the collar means, as did the previous upset portion on the bars. However, these rims 100 must be intimately attached to the bars to be effective, as are the collar means of which they are a part. Therefore, both the collar means and rims 100 are formed with a common cylindrical aperture only slightly larger in diameter than the outside diameter of the bar 20 or 50 to which they are attached. Then a thin film 101 of bonding material is placed between the inside cylindrical surface of the collar means 24 or 64 and its tapered rim 100 and the outside cylindrical surface of its bar 20 or 50 to form the intimate connection between these parts that is required, so that the tapered rim or ring portion 100 distributes the shearing stress over the area of its thickness and prevents a sharp change of shear between the edge of the collar means 24 or 64, and the bar member 20 or 50, respectively.

If desired, the projecting ring 100 may be formed of a separate machined piece of material 102 as shown in Figs. 9, 10 and 11, which rim 102 may be fit (as shown in Fig. 9) over the end of a torsion bar 50 together with its collar means 104 and then bonded by a film 101 of bonding material to the side of collar means 104, which may be simultaneously with the bonding of the collar means to the bar 50 to form an integral assembly, similar to the assembly shown in Figs. 1 and 3 for collar means 24 and 64.

Such a beveled ring 102 may also be used against the block means 55 shown in Fig. 3 for connecting one end of the bar 50 to the outer torsion member 51. Similar, beveled rings or rims 102 are also shown in Figs. 5 through 8 for anchoring the collars 76 and 86 to their inner torsion bars 70 and 80, respectively. Furthermore, a similar and larger ring 106, as shown in Fig. 1, may be provided against the collar means 23 for anchoring it to the outside of the slit tubular outer torsion member 21.

Thus, the beveled projecting rim or ring 102 or 106 may be separately formed to be bonded to a collar or block that is to be connected to a torsion bar having cylindrical ends or such rims 100 may be formed, machined and/or forged integral with such collars or blocks, as shown for the collar means 24 and 64 in Figs. 1 and 3, respectively.

In order to provide sufficient bonding material to produce the desired film between the collar members and the torsion bars to which they are connected, there may be provided, if desired, one or more internal grooves 107, as shown in the collar means 64 in Fig. 3, or external grooves 108 around the outside of the end of the cylindrical torsion rod 50, as shown in the block 55 in Fig. 3, into which grooves torus type rings of bonding material may be inserted before the collar 64 or block 55 is slipped over the bar 50.

If the bonding material melts at a sufficiently high temperature, such as a brazing material, then if desired, when the resulting spring assembly is heat treated, these rings of brazing material in the grooves 107 and 108 will melt and form the bonding film 101 between the parts, which film is not destroyed when the assembly is quenched and tempered. Thus, it is possible to braze and integrally assemble the elements or parts of the torsion spring assembly of this invention, simultaneously with the heat treating step of the springs therein, as well as omitting the expensive machining, forging, and/or upsetting operations on the torsion bars.

IV. Applications of spring

One of the many applications of the torsion spring assembly of this invention is disclosed in Fig. 12, in which an embodiment for the outer torsion member of the spring assembly similar to that shown in Figs. 3 and 4 is employed, and adapted for the suspension of the tandem axles of a truck trailer. The eight wheels 110 of this vehicle or trailer are shown mounted on two parallel axles 111 and 112, which axles are connected to a frame 113, parts of which are broken away. The whole torsion spring suspension comprises two torsion spring assemblies, mounted along each side of the trailer adjacent the inside of the wheels 110, with the torsion members being mounted for rotation in plastic lined bearings 115 (four on each torsion spring assembly) anchored to the bottom of the frame 113. There is a pair of such bearings on each spring assembly above each axle 111 and 112, which bearings journal tubular sleeves 116 above the axle 111, and sleeves 117 above the axle 112. Between each pair of bearings 115 are fixedly anchored a pair of levers 118 to the sleeves 116, and levers 119 to the sleeves 117. Links 121 are pivotally connected between the levers 118 and supports 122 on the axle 111; and links 123 are connected between the levers 119 and supports 124 on the axle 112. In order to increase the stability of the vehicle the supports 122 and 124 are located as far apart as possible on each of the axles 111 and 112, so that the axes of each spring assembly are at an angle to the center line of the vehicle.

Each torsion spring assembly is fixedly connected between its sleeve 116 and its sleeve 117, so that one end of the inner torsion member or bar 130 has one of its ends fixedly connected with a sleeve 116 controlled by links 121, and its other end connected to an adjacent end of its U-shaped strip outer torsion member 131, which in turn has its other end fixedly connected with a sleeve 117 controlled by links 123. These torsion members 130 and 131 herein correspond respectively to the torsion members 50 and 51 shown in Fig. 3. As previously mentioned, the torsion bars 130 have upset polygonal ends 133 to provide a gradual distribution of the end shearing forces to the upset beveled portions 134 adjacent thereto, which beveled portions correspond to the beveled or tapered rims or rings 102, 106 and 100 mentioned in Section III above. One end 133 of the bar 130 is anchored inside a sleeve 116 and its other end in a block 135 (similar to the block 55 shown in Fig. 3), which block 135 may be surrounded by a welded link 136 (similar to the link 56 described in Figs. 3 and 4) to anchor the base of the U-shaped outer torsion member 131 thereto. The ends of the U-shaped strip may be mounted in a collar 143 (similar to collar 63 shown in Fig. 3) which collar in turn is fixedly connected to a sleeve 117.

The normal operational movements of the torsion spring assembly of this invention may amount to about a 90° of twist for each of the members 130 and 131 as shown in Fig. 12, part of which twist is shown for the U-shaped strip outer torsion members 131, in that these torsion assemblies are already under strain due to the weight of the vehicle on the wheels 110.

Although only the embodiments disclosed in Figs. 3 and 4 were shown applied to a tandem axled vehicle, other embodiments may be employed in place thereof, as well as other connecting and fastening means, which also are applicable to other types of vehicle suspensions, without departing from the scope of this invention. Furthermore, the stiffness of the two different torsion members of different cross sectional areas, one of which is discontinuous, may be varied by using different types of materials for the spring members, as well as using different types of shapes for their cross-sectional areas.

If desired, one or more stops (not shown) may be placed along the length of either one or both of the torsion members 20—21, 50—51, 70—71, 80—81, and/or 130—131, so as to limit or change their resistance and degree of twist, and such stops may be anchored or connected to one or the other of the torsion members by the bonding means and method described in Section III above, as well as by any other means such as a pin 25, an upset, a splined or a keyed portion.

Although several different embodiments and methods and means of assembly of the invention are disclosed in specific combinations, it is to be clearly understood that any one of the features of any method or means may be employed in any one of the other combinations or embodiments, without departing from the scope of this invention. That is, it is not necessary that the specific method of connecting the collar means shown in Figs. 1 through 11 be employed solely for the specific type of two membered spring of this invention, nor is it necessary that an upset torsion bar member as shown in Fig. 12, need only be used with the specific embodiment disclosed in Fig. 3.

While there is described above the principles of this invention in connection with specific apparatus, it is to be clearly understood that this description is made only by way of example and not as a limitation to the scope of this invention.

What is claimed is:

1. A torsion spring device comprising: an inner solid torsion bar member and an outer torsion spring member, said outer torsion spring member being spaced from and surrounding said inner torsion member and having at least one longitudinal slot extending throughout its effective length substantially parallel to the axis of said members and said outer torsion member being at least as flexible per unit of length as said inner torsion member, means attaching one end of said inner torsion member to an adjacent end of said outer torsion member, and a torque transmitting means at the other end of at least one of said torsion members including a collar having an aperture therein into which said one member is fitted, said collar having a tapered extension on one side thereof, and means for bonding said torque transmitting means to said one torsion member, said bonding means comprising a film of brazed material between the entire inside surfaces of said collar and said extension and the outside surface of said one member, through which film alone the torque is transmitted between said torque transmitting means and said one torsion member.

2. A torsion spring device according to claim 1 wherein said outer torsion member comprises a split torsion tube.

3. A torsion spring device according to claim 1 wherein said outer torsion member comprises a plurality of parallel spaced torsion strips symmetrically arranged around the axis of said torsion members.

4. A torsion spring device according to claim 1 wherein said outer torsion member comprises a U-shaped strip and wherein said means for attaching it to said inner torsion member is at the base of the U of said strip.

5. A torsion spring device according to claim 1 wherein said tapered extension is integral with said collar means.

6. A torsion spring device according to claim 1 wherein said tapered extension is fixed by a film of bonded material to said collar means.

7. A torsion spring device according to claim 1 including grooves between the adjacent cylindrical surfaces of said collar means and said torsion member for holding said bonding material for forming said bonded film.

References Cited in the file of this patent

UNITED STATES PATENTS

| | | |
|---|---|---|
| 1,550,157 | Gillette | Aug. 18, 1925 |
| 2,016,753 | Patzig | Oct. 8, 1935 |
| 2,058,618 | Patzig | Oct. 27, 1936 |
| 2,163,131 | Porsche | June 20, 1939 |
| 2,332,368 | Burtenshaw | Oct. 19, 1943 |
| 2,363,113 | Bennett | Nov. 21, 1944 |
| 2,480,934 | Julien | Sept. 6, 1949 |
| 2,518,867 | Clary | Aug. 15, 1950 |
| 2,653,828 | Alley | Sept. 29, 1953 |
| 2,694,319 | Johnson | Nov. 16, 1954 |
| 2,751,217 | Thompson | June 19, 1956 |
| 2,787,460 | Chiabrandy et al. | Apr. 2, 1957 |
| 2,925,264 | Loehr | Feb. 16, 1960 |

FOREIGN PATENTS

| | | |
|---|---|---|
| 872,258 | France | Feb. 5, 1942 |
| 749,208 | Germany | Nov. 17, 1944 |